F. G. SMITH.
VALVE FOR STEEL MAKING FURNACES OR MIXERS AND THE LIKE.
APPLICATION FILED NOV. 7, 1918.
1,320,284.  Patented Oct. 28, 1919.
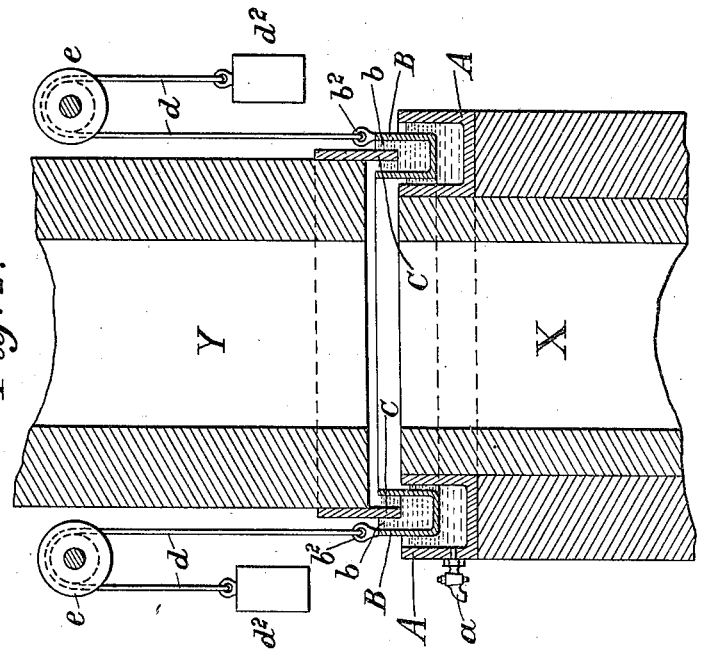
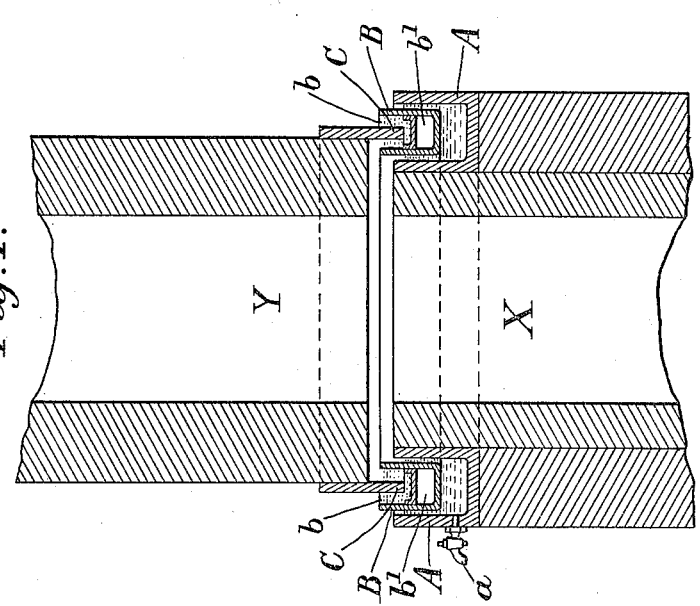
INVENTOR
FREDERICK GEORGE SMITH
BY Hoxsone and Hoxsone
ATTORNEYS

UNITED STATES PATENT OFFICE.

FREDERICK GEORGE SMITH, OF PURLEY, ENGLAND, ASSIGNOR OF ONE-HALF TO WELLMAN SEAVER AND HEAD LIMITED, OF LONDON, ENGLAND.

VALVE FOR STEEL-MAKING FURNACES OR MIXERS AND THE LIKE.

1,320,284.            Specification of Letters Patent.        Patented Oct. 28, 1919.

Application filed November 7, 1918. Serial No. 261,450.

*To all whom it may concern:*

Be it known that I, FREDERICK GEORGE SMITH, a subject of the King of Great Britain, residing at "Mameena," Church Hill, Purley, in the county of Surrey, England, have invented new and useful Improvements in Valves for Steel - Making Furnaces or Mixers and the like, of which the following is a specification.

This invention has for its object to provide steel-making furnaces, or mixers, and the like apparatus in which a part of the structure is used to afford communication between portions such as between the furnace port and the port of the regenerator, with a sealing device which is very simple and economical in construction and maintenance, not liable to readily get out of order, and which can be operated to open and to seal the ports with great facility.

According to this invention the trough of the seal which surrounds the lower port contains a second sealing device holding liquid into which enters a projection surrounding the upper port, the said second sealing device being provided with means which will cause it to rise, or to be raised, in the liquid in the said trough when the seal is made, the said second sealing device descending, or being lowered, in the said trough to break the seal around the upper port, and rising or being raised, in the said liquid to re-make the seal.

The accompanying drawings represents, in vertical section in Figure 1, a construction, or arrangement, according to this invention, and Fig. 2 shows a modification as hereinafter described, but I do not limit myself to the precise details illustrated.

Referring to Fig. 1; the trough A, which surrounds the lower port X, is provided with a tap, $a$, or the like, by means of which liquid can be withdrawn. The second sealing device consists of a trough-like ring B, or the equivalent, whose upper portion constitutes a trough $b$ for liquid and whose lower portion $b^1$ is hollow and constitutes an air-space so that the said ring, or the like, B, will float in, or on, the liquid in the said trough A, and then a projecting ring C, which surrounds the lower end of the upper port structure Y, will enter the liquid in the upper portion $b$ of the said second sealing device and the seal will be complete. The said second sealing device B, can be guided in the trough A, by any suitable means. To break the seal, liquid is drawn off from the first trough A, by the tap $a$, or the like. Liquid is introduced into the said trough A to remake the seal.

Instead of the said ring B, or the like, being made buoyant by means of an air-space, as described, it may be raised and lowered by mechanical means.

An example of how this may be done is shown in Fig. 2, where the ports which correspond with those shown in Fig. 1 are marked with the same reference letters.

The ring B has cords, or chains, $d$, attached to it at $b^2$ (at any required number of places), the said cords or chains, passing over pulleys $e$ (carried by brackets from any suitable supports) and carrying at their other ends counterweights $d^2$ which will keep the ring B elevated when liquid is in the trough A, and allow the ring B, to descend when liquid is withdrawn from the said trough.

What I claim is:—

1. A liquid seal comprising a sealing member, a fixed trough beneath the same, and an intermediate sealing trough arranged in the fixed trough and into which the fixed sealing member dips, said intermediate trough being vertically movable to make or break seal with the fixed sealing member.

2. A liquid seal comprising a sealing member, a fixed trough beneath the same, and an intermediate sealing trough sustained, at least in part, by the liquid in the fixed trough and rising or falling with a variation in the liquid level in the fixed trough to make or break seal with the sealing member.

3. In a liquid seal, a sustaining trough, a sealing trough supported, at least in part, by the liquid in the sustaining trough and rising or falling with a variation in the liquid level in the sustaining trough, for the purpose specified.

4. In a liquid seal, a sustaining trough and a sealing trough floating therein and rising or falling with a variation in the liquid level in the sustaining trough, for the purpose specified.

5. In a liquid seal, a floating seal trough having an upper compartment for the sealing liquid and a lower flotation compartment.

6. In a liquid seal for the joint between vertically alined pipes, a sealing flange projecting downward from the upper pipe, a trough carried by the lower pipe, and an interposed sealing trough into which the sealing flange dips, said sealing trough rising or falling with a variation in the liquid level in the trough carried by the lower pipe and serving to make or break seal with the sealing flange, substantially as described.

In testimony whereof I have signed my name to this specification in the presence of two subscribing witnesses.

FREDERICK GEORGE SMITH.

Witnesses:
G. F. TYSON,
LEONARD WALTER.

Copies of this patent may be obtained for five cents each, by addressing the "Commissioner of Patents, Washington, D. C."